(12) United States Patent
Fiorese et al.

(10) Patent No.: US 10,514,051 B2
(45) Date of Patent: Dec. 24, 2019

(54) GAS CYLINDER ACTUATOR WITH SAFETY DEVICE

(71) Applicant: SPECIAL SPRINGS S.R.L., Romano d'Ezzelino (IT)

(72) Inventors: Massimo Fiorese, Bassano Del Grappa (IT); Daniel Fantinato, Bassano Del Grappa (IT); Roberto Rech, Nove (IT)

(73) Assignee: SPECIAL SPRINGS S.R.L., Romano d'Ezzelino (IT)

( * ) Notice: Subject to any disclaimer, the term of this patent is extended or adjusted under 35 U.S.C. 154(b) by 133 days.

(21) Appl. No.: 15/379,698

(22) Filed: Dec. 15, 2016

(65) Prior Publication Data

US 2017/0175785 A1 Jun. 22, 2017

(30) Foreign Application Priority Data

Dec. 21, 2015 (IT) .................... 102015000085548

(51) Int. Cl.
*F15B 15/26* (2006.01)
*F15B 15/14* (2006.01)
(Continued)

(52) U.S. Cl.
CPC ........ *F15B 15/261* (2013.01); *F15B 15/1428* (2013.01); *F16F 9/3242* (2013.01);
(Continued)

(58) Field of Classification Search
CPC ...... F16F 7/12; F16F 7/003; F16F 9/06; F16F 9/02; F16F 9/3242
See application file for complete search history.

(56) References Cited

U.S. PATENT DOCUMENTS

2003/0110942 A1   6/2003  Wirth et al.
2006/0231991 A1*  10/2006 Chun .................... F16F 9/0218
                                                                  267/119
2013/0228069 A1*  9/2013  Cappeller ............... F16J 10/00
                                                                  92/169.1

FOREIGN PATENT DOCUMENTS

CN        102405360 A     4/2012
CN        103291684 A     9/2013
(Continued)

OTHER PUBLICATIONS

Chinese Office Action dated Jul. 29, 2019 received in Chinese Patent Application No. 201611191092.1.

*Primary Examiner* — Michael Leslie
*Assistant Examiner* — Daniel S Collins
(74) *Attorney, Agent, or Firm* — Scully, Scott, Murphy & Presser, P.C.

(57) ABSTRACT

A gas cylinder actuator with safety device, comprising a tubular containment jacket, two opposite heads for closing the tubular jacket, with corresponding sealing elements between the heads and the jacket, a first head having a through hole for the passage of a stem-piston, and a second opposite head, a stem-piston, between the tubular jacket, the heads and the stem-piston there being a chamber for pressurized gas, wherein at least one head of the two heads is constituted by a body that is separate with respect to the tubular jacket and is retained in the tubular jacket by means of an extraction-preventing shoulder that protrudes from the body of the head and is adapted to abut against a corresponding internal annular protrusion that protrudes radially from the internal surface of the tubular jacket.

10 Claims, 5 Drawing Sheets

(51) Int. Cl.
 *F16F 9/32* (2006.01)
 *F16F 9/02* (2006.01)
(52) U.S. Cl.
 CPC ........... *F16F 9/0218* (2013.01); *F16F 9/0281* (2013.01); *F16F 2230/24* (2013.01)

(56) References Cited

FOREIGN PATENT DOCUMENTS

| | | | | |
|---|---|---|---|---|
| EP | 2634451 | A1 | 9/2013 | |
| EP | 2933524 | A1 | 10/2015 | |
| FR | 2833326 | A1 | 6/2013 | |
| WO | WO2010/121946 | * | 10/2010 | ............... F16J 10/00 |

* cited by examiner

GAS CYLINDER ACTUATOR WITH SAFETY DEVICE

The present invention relates to a gas cylinder actuator with safety device.

Gas cylinder actuators are generally formed by a tubular gas containment jacket, which is closed hermetically at one end by a first head provided with a gas filling valve and at the opposite end by a second head, which is provided with a hole for the passage of a stem with a piston, which translates inside said jacket; the jacket and the two heads form the stroke compartment of the piston, while said piston, with the jacket and the first head, forms the chamber for the pressurized gas.

These gas cylinder actuators are typically but not exclusively used in situations, such as molds, molding presses; and the like, in which they can be subjected to conditions of use such that they can be damaged; this damage can render the gas cylinder actuator itself unusable, requiring replacement and the interruption of the work of the machinery or equipment in which it is arranged to work, and can also be such as to damage an operator who is in the vicinity, as in the case of failure due to overpressure, or in the case of ejection of the stem by fracture and separation from the piston, due to an unexpected and uncontrolled rising thrust caused by the pressurized gas, i.e., the so-called "uncontrolled return" phenomenon.

Experience teaches that the most critical condition is observed when a mold, on which a gas cylinder actuator acts, jams with the gas cylinder actuators in the compression configuration and then said mold releases suddenly, causing an unexpected return thrust of the stem-piston, such as to break, as a consequence of impact, either the perforated head that retains the stem-piston in the jacket or the stem-piston.

In both cases there is the severe risk that the stem is ejected forcefully, with great danger for any personnel in the vicinity.

In order to obviate this drawback, various means and devices are currently known for obviating the phenomenon of uncontrolled return of the stem-piston.

A first type of these devices provides for the presence of an extraction-preventing auxiliary shoulder that is formed on the stem proximate to the piston, so that if a fracture occurs between the stem and the piston in the region that connects them, the stem is retained within the jacket by virtue of the abutment of said auxiliary shoulder against a corresponding abutment shoulder provided on the second perforated head of the gas cylinder actuator.

A second type of safety device with respect to a situation of uncontrolled return of the stem-piston provides for a preset part of the piston or of the stem to separate following an impact of predefined force, and for said part to damage the sealing gasket of the piston or of the stem, allowing external discharge of the pressurized gas and preventing the violent and uncontrolled ejection of said stem.

Both of these described types operate to retain the stem inside the jacket.

However, events might occur for which the predefined failures in the types described above are not sufficient to ensure a discharge of the pressurized gas that is fast enough to prevent the gas cylinder actuator from failing in other points in addition to the ones provided or to prevent the stem-piston from being ejected.

The aim of the present invention is to provide a gas cylinder actuator with safety device that is capable of obviating the limitations of currently known gas cylinder actuators with safety devices.

Within this aim, an object of the invention is to provide a gas cylinder actuator that ensures safe exit of the pressurized gas without the stem-piston failing in case of an uncontrolled return situation.

Another object of the invention is to provide a gas cylinder actuator in which any overpressure in the compression and expansion chamber never causes the uncontrolled ejection of the stem-piston.

A further object of the invention is to provide a gas cylinder actuator that has a performance that is not lower than that of similar gas cylinder actuators of the known type.

Another object of the invention is to provide a gas cylinder actuator that can be installed easily in machines and equipment of the known type without particular solutions.

This aim, as well as these and other objects that will become better apparent hereinafter, are achieved by a gas cylinder actuator with safety device, comprising a tubular containment jacket, two opposite heads for closing said tubular jacket, with corresponding sealing elements between the heads and the jacket, a first head having a through hole for the passage of a stem-piston, and a second opposite head, a stem-piston, between said tubular jacket, said heads and said stem-piston there being a chamber for pressurized gas, said gas cylinder actuator being characterized in that at least one head of said two heads is constituted by a body that is separate with respect to said tubular jacket and is retained in said tubular jacket by means of an extraction-preventing shoulder that protrudes from the body of said head and is adapted to abut against a corresponding internal annular protrusion that protrudes radially from the internal surface of the tubular jacket, the extraction-preventing shoulder and the internal annular protrusion being adapted to cooperate in order to prevent the extraction of the head from the tubular jacket, said extraction-preventing shoulder being intended to deform, reducing its own diametrical space occupation in case of uncontrolled return in an axial direction, so as to allow the relative movement of the corresponding head toward the outside of said tubular jacket and the forming of a gas discharge passage between the jacket, the head and the corresponding sealing element.

Further characteristics and advantages of the invention will become better apparent from the description of two preferred but not exclusive embodiments of the gas cylinder actuator according to the invention, illustrated by way of nonlimiting example in the accompanying drawings, wherein.

Figure 1:
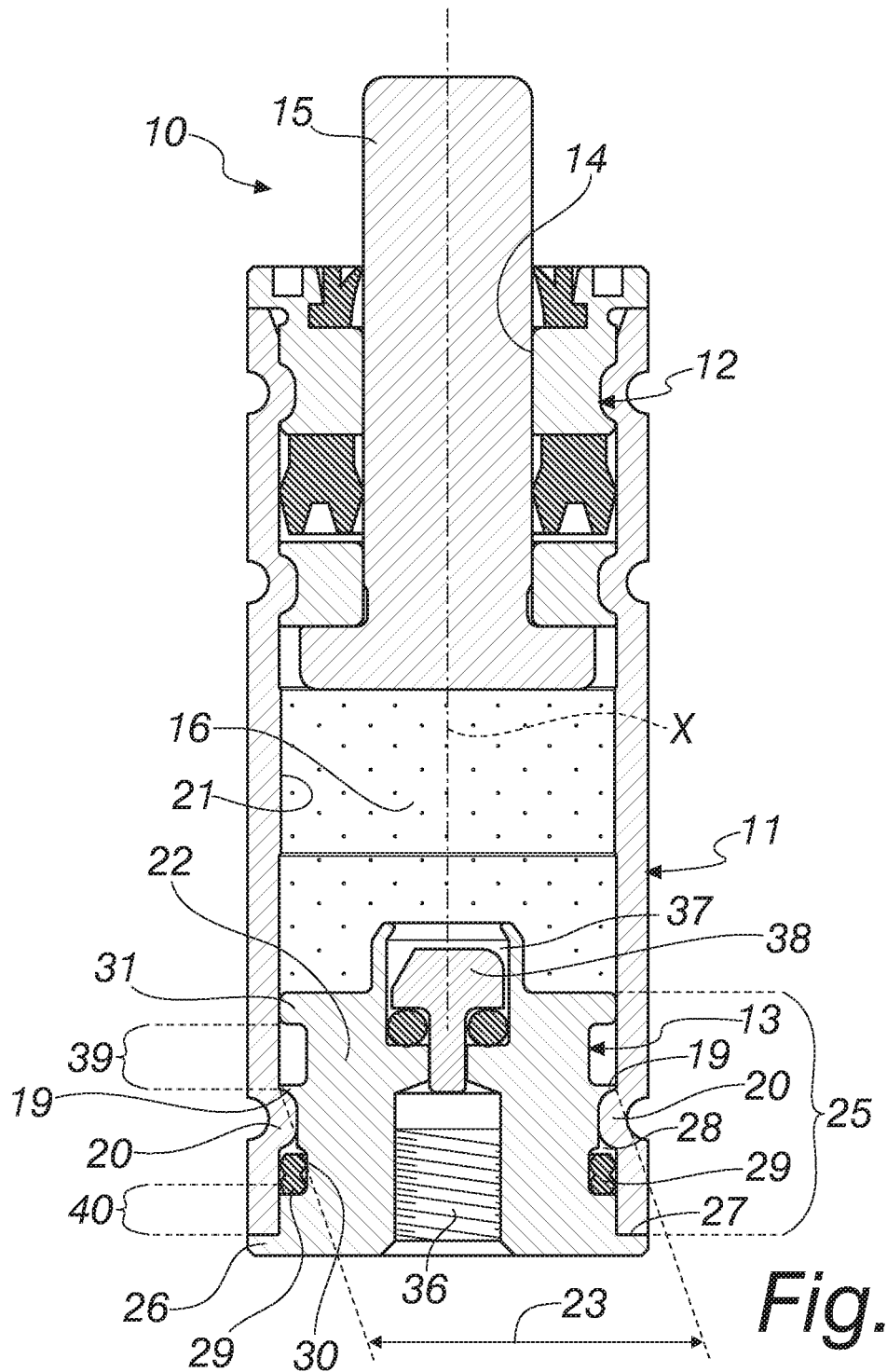
FIG. 1 is a sectional side view of a gas cylinder actuator according to the invention in a first embodiment thereof.
Figure 2:
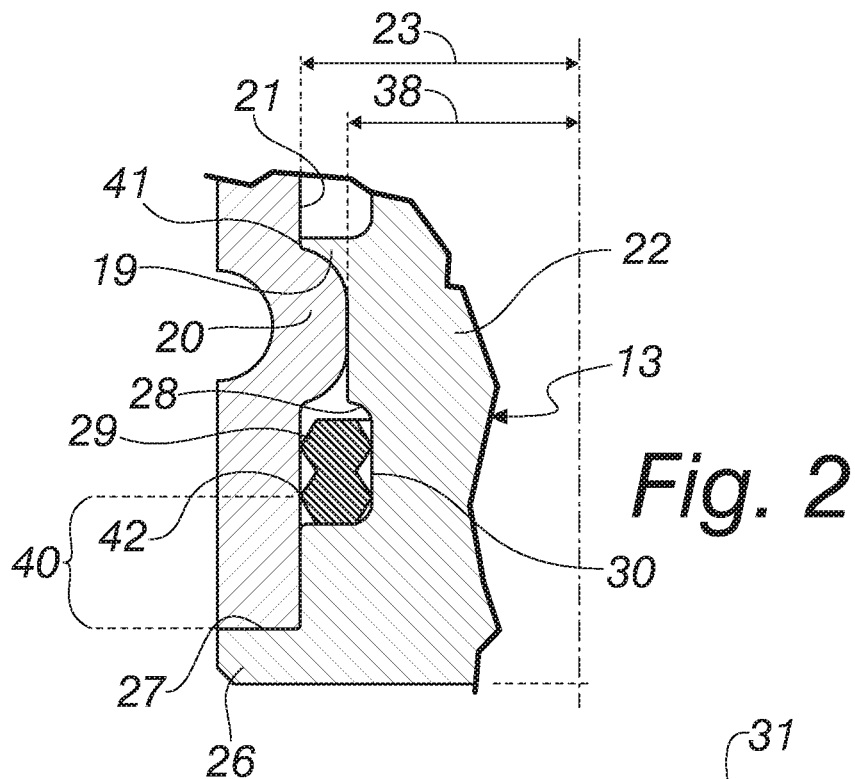
FIG. 2 is a view of a detail of FIG. 1.

With reference to the figures, a gas cylinder actuator with safety device, useful both as a safety for uncontrolled return of the stem-piston and for overpressure safely, according to the invention, is designated generally in a first embodiment by the reference numeral 10.

The gas cylinder actuator 10 comprises:
a tubular containment jacket 11,
two opposite heads 12 and 13 for closing the tubular jacket 11, with corresponding sealing elements between the heads and the jacket, described hereinafter; a first head 12 is provided with a through hole 14 for the passage of a stem-piston 15, and a second opposite head 13,
a stem-piston 15,
between the tubular jacket 11, the heads 12 and 13 and the stem-piston 15 there is a chamber for pressurized gas 16.

The second head 13 of the two heads 12 and 13 is constituted by a body 22 that is distinct with respect to the tubular jacket 11 and is retained in the tubular jacket 11 by means of a deformable extraction-preventing shoulder 19, which protrudes from the body 22 of the head 13 and is adapted for abutment against a corresponding internal annular protrusion 20 that protrudes radially from the internal surface 21 of the tubular jacket 11; the deformable extraction-preventing shoulder 19 and the internal annular protrusion 20 are therefore adapted to cooperate in order to prevent the extraction of the second head 13 from the tubular jacket 11.

The deformable extraction-preventing shoulder 19 is designed to deform, reducing its own diametrical space occupation 23 in case of uncontrolled return, and consequent compression, in an axial direction X, so as to allow the relative movement of the corresponding head 13 toward the outside of the tubular jacket 11 and the definition of a gas discharge passage 24 between the jacket 11, the head 13 and the corresponding sealing element.

Figure 3:
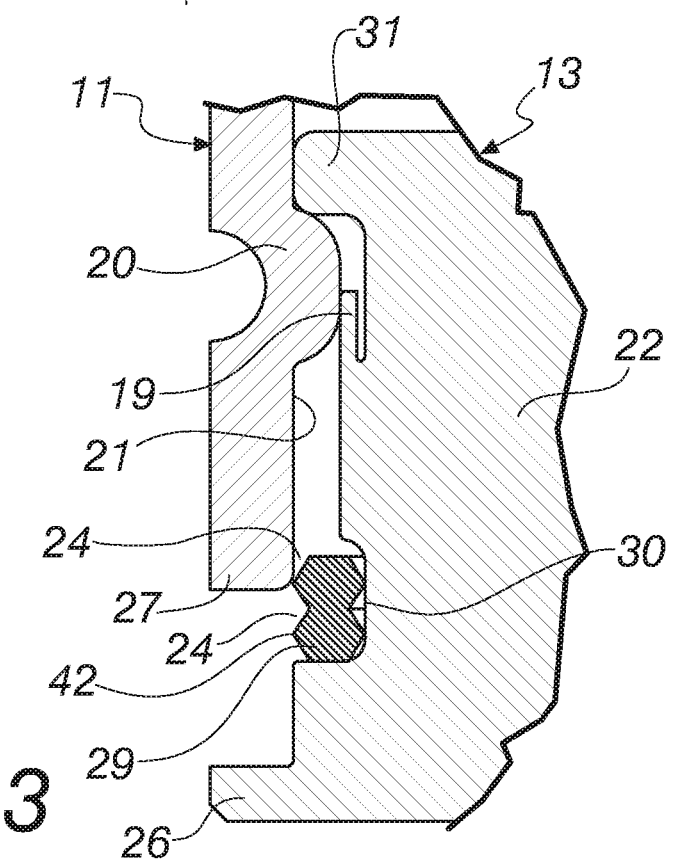
FIG. 3 is a view of the same detail as FIG. 2 in a situation in which an uncontrolled return event has occurred.
Figure 4:
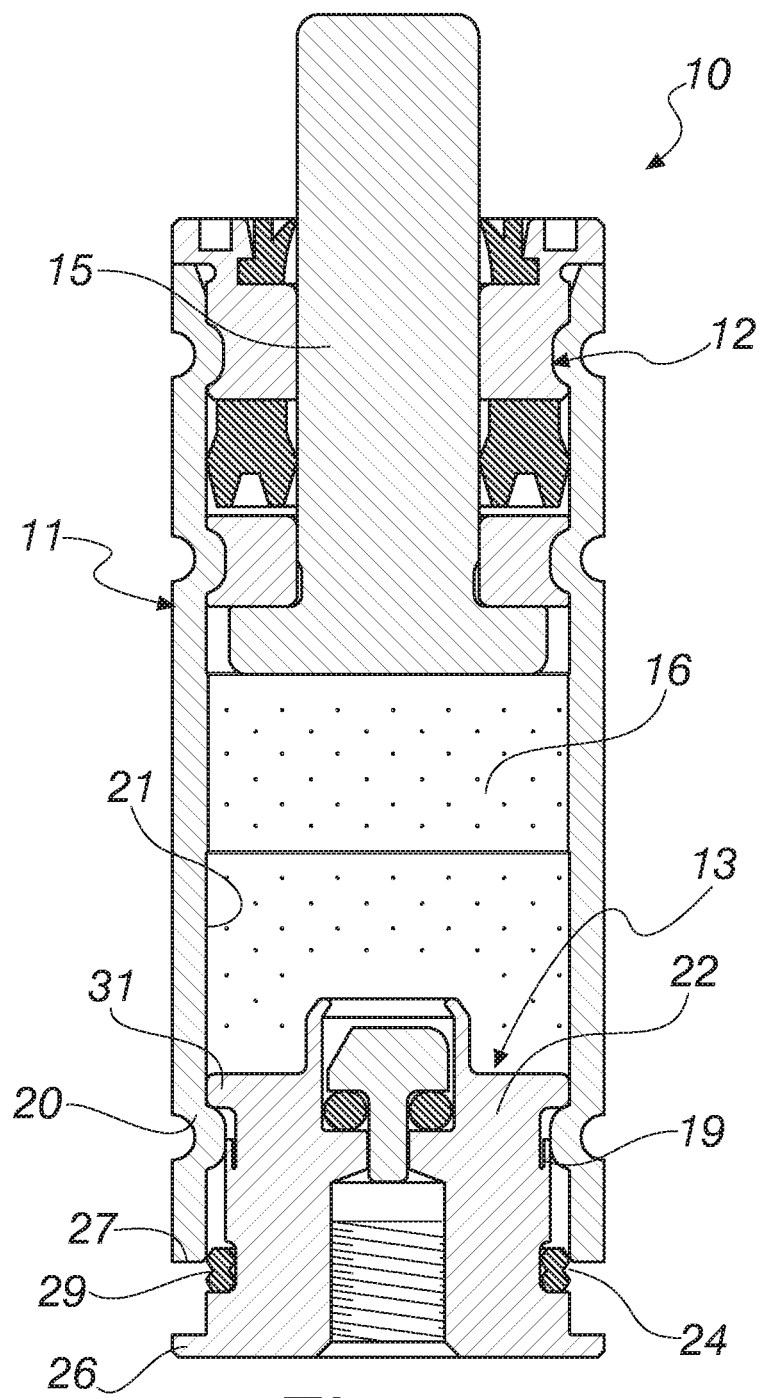
FIG. 4 is a view of the gas cylinder actuator of FIG. 1 in a situation in which an uncontrolled return event has occurred.

This discharge passage 24 is shown clearly in FIG. 3.

The second head 13, for closure of the tubular jacket 11 on the opposite side with respect to the first head 12, is constituted by the body 22, which has a cylindrical symmetry and is contoured to arrange itself in a corresponding end portion 25 of the tubular jacket 11, the body 22 having:
a wider perimetric edge 26, for the resting in an axial direction X for the end edge 27 of the tubular jacket 11;
an annular slot 28 for a sealing element, for example a static sealing ring 29, designed to act between the external surface 30 of the second head 13 and the internal surface 21 of the tubular jacket 11;
the deformable extraction-preventing shoulder 19;
an extraction-preventing safety shoulder 31, which is designed to encounter the internal annular protrusion 20 without deforming or by deforming partially but so as to prevent in any case the complete extraction of the second head 13 from the end portion 25 of the tubular jacket 11;
a gas loading hole 36;
a seat 37 for a check valve 38.

The deformable extraction-preventing shoulder 19 has a contour and dimensions of such thickness that, when subjected to compression in a direction X on the part of the internal annular protrusion 20, which in turn is supported by the tubular jacket 11, of which it is a part, so as to move in the direction and with the orientation of the stem-piston 15 in case of an uncontrolled return event, it deforms, bending in the direction X so as to assume a radial space occupation 23 that is equal to or smaller than the internal radial space occupation 38, indicated in FIG. 3, determined by the internal annular protrusion 20, and in any case such as to allow the internal annular protrusion 20 to move at least partly beyond the deformable extraction-preventing shoulder 19 in the axial direction X.

The deformable extraction-preventing shoulder 19 is arranged between the annular slot 28 and the extraction-preventing safety shoulder 31.

The extraction-preventing safety shoulder 31 is provided at a distance 39 from a point of first encounter and stroke limit 41 on the internal annular protrusion 20 that is greater than the distance 40 between the point of first sealing 42 of the seal ring 29, in its slot 28, and the end 27 of the tubular jacket 11.

The point of first sealing 42 is to be understood as the point where ideally the sealing ring 29 begins to work in order to prevent the exit of pressurized gas through the clearance between the second head 13 and the internal jacket 11.

When the point of first sealing 42 is no longer pressed against the internal surface 21 of the tubular jacket 11, it should be assumed that the sealing ring 29 can no longer ensure its full functionality, thus allowing the pressurized gas to find an escape path.

In this situation, in case of an uncontrolled return event, the relative translation in the axial direction X between the second head 13 and the end portion 25 of the tubular jacket 11 in which it is inserted is such as to allow the sealing ring 29 to disengage from the internal surface 21 of the tubular jacket 11, providing the discharge passage 24.

Figures 5, 6:
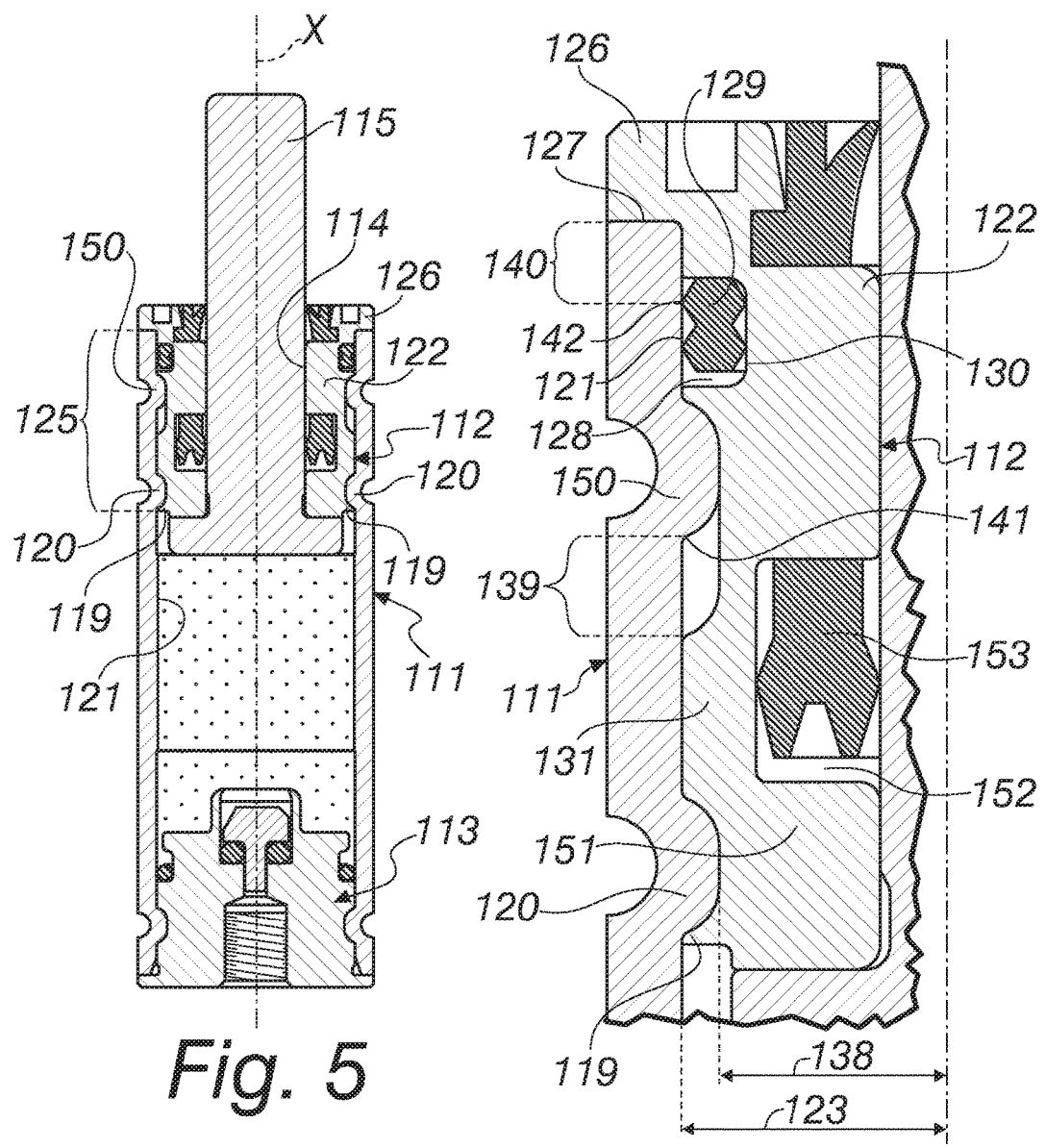
FIG. 5 is a sectional side view of a gas cylinder actuator according to the invention in a second embodiment.
FIG. 6 is a view of a detail of FIG. 5.
Figure 7:
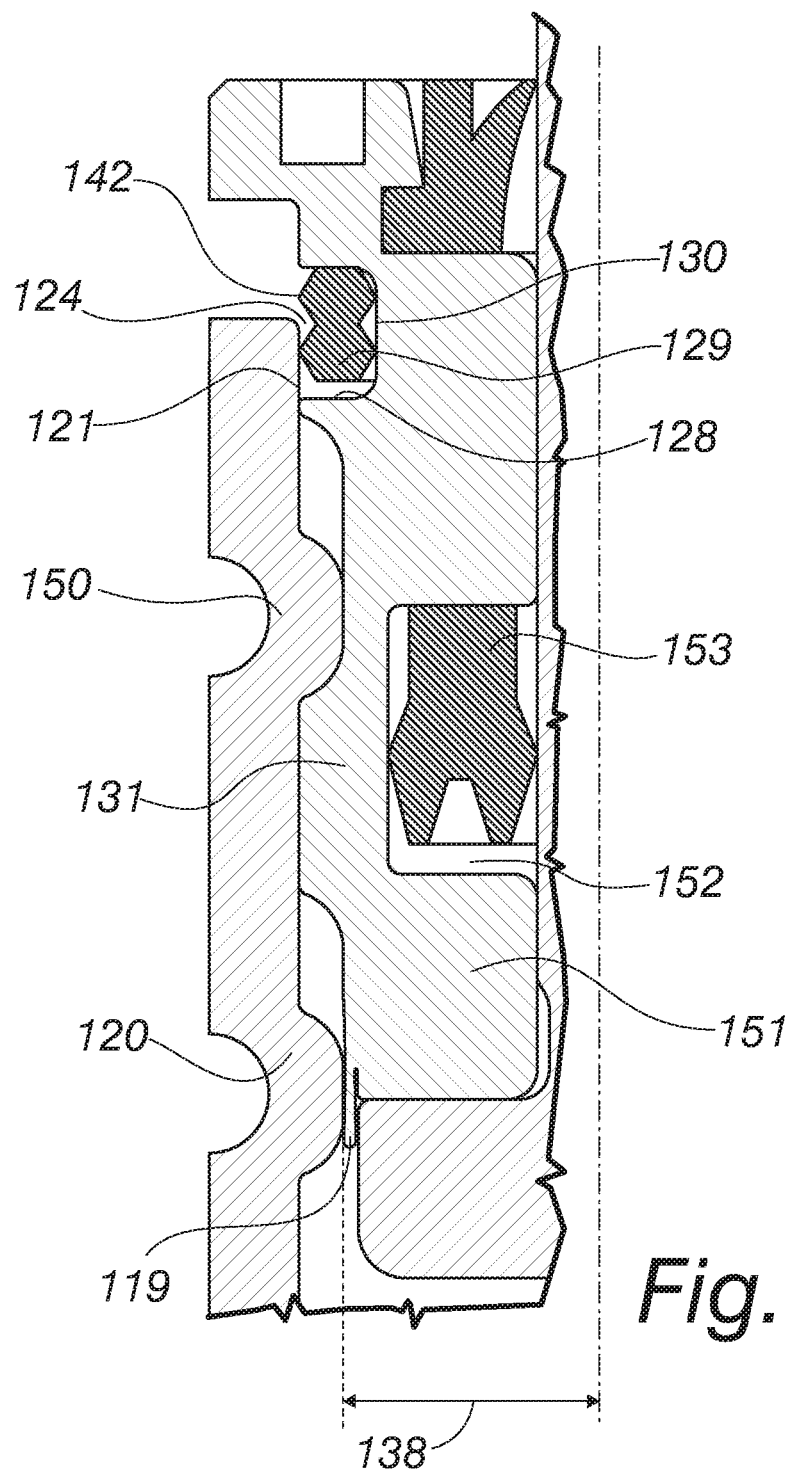
FIG. 7 is a view of the same detail of FIG. 6 in a situation in which an uncontrolled return event has occurred.

A second embodiment of the gas cylinder actuator according to the invention is shown in FIGS. 5, 6 and 7 and is designated therein by the reference numeral 110.

In this second embodiment, the first head 112 of the two heads 112 and 113 is constituted by a body 122 that is distinct with respect to the tubular jacket 111 and is retained in the tubular jacket 111 by means of a deformable extraction-preventing shoulder 119, which protrudes from the body 122 of the first head 112 and is adapted for abutment against a corresponding first internal annular protrusion 120 that protrudes radially from the internal surface 121 of the tubular jacket 111; the deformable extraction-preventing shoulder 119 and the first internal annular protrusion 120 are therefore adapted to cooperate in order to prevent the extraction of the first head 112 from the tubular jacket 111.

The deformable extraction-preventing shoulder 119 is designed to deform, reducing its own diametrical space occupation 123 in case of uncontrolled return, and consequent compression, in the axial direction X, so as to allow the relative movement of the first head 112 toward the outside of the tubular jacket 111 and the forming of a gas discharge passage 124 between the jacket 111, the head 112 and the corresponding sealing element.

This discharge passage 124 is shown clearly in FIG. 7.

The first head 112, for closure of the tubular jacket 111 on the opposite side with respect to the second head. 113, is constituted by the body 122, which has a cylindrical symmetry and is contoured to arrange itself in a corresponding end portion 125 of the tubular jacket 111.

The body 122 has:
a wider perimetric edge 126, for resting contact in the axial direction X for the end edge 127 of the tubular jacket 111;
an annular slot 128 for a sealing element, for example a static sealing ring 129, which is designed to act between the external surface 130 of the first head 113 and the internal surface 121 of the tubular jacket 111;
the deformable extraction-preventing shoulder 119;

an extraction-preventing safety shoulder 131, designed to encounter a second internal annular protrusion 150 without deforming or by deforming partially but so as to prevent in any case the complete extraction of the first head 112 from the end portion 125 of the tubular jacket 111;

the through hole 114 for the stem-piston 115;

an annular guiding and abutment portion 151 for the stem-piston. 115;

an internal annular slot 152 for a dynamic sealing ring 153, adapted to provide the seal in the through hole 114 against the stem-piston 115.

In this second embodiment of the invention also, the deformable extraction-preventing shoulder 119 has a contour and dimensions in thickness such that when subjected to compression in the direction X by the internal annular protrusion 120, since it is supported by the body 122 of the first head 112, of which it is a part, so as to move in the direction and with the orientation of the stem-piston 115 in case of an uncontrolled return event, it deforms, bending in the direction X so as to assume a radial space occupation 123 that is equal to or smaller than the internal radial space occupation 138, designated in FIGS. 6 and 7, determined by the internal annular protrusion 120, and in any case such as to allow the internal annular protrusion 120 a relative translational motion such as to pass at least partly beyond the deformable extraction-preventing shoulder 119 in the axial direction X.

In this embodiment, the deformable extraction-preventing shoulder 119 is provided at the annular guiding and abutment portion 151 of the body 122 of the first head 112.

The extraction-preventing safety shoulder 131 is provided at a distance 139 from the point of first encounter and stroke limit 141 on the second internal annular protrusion 150 that is greater than the distance 140 between the point of first sealing 142 of the sealing ring 129, in its slot 128, and the end 127 of the tubular jacket 111.

In this situation, in case of an uncontrolled return event, the relative translation in the axial direction X between the first head 112 and the end portion 125 of the tubular jacket 111 in which it is inserted is such as to allow the sealing ring 129 to disengage from the internal surface 121 of the tubular jacket 111, forming the discharge passage 124.

Practical tests have shown that the gas cylinder actuated according to the invention acts also as an overtravel safety in situations for use in molds, molding presses, and the like, in which they can be subjected to situations of high internal pressure or impact with the associated parts of a press or mold.

In practice it has been found that the gas cylinder actuated according to the invention achieves the intended aim and objects.

In particular, the gas cylinder actuated according to the invention ensures the safe exit of the pressurized gas in case of an uncontrolled return event of the stem-piston, without the uncontrolled ejection of the stem or of a part thereof occurring.

Moreover, in the gas cylinder actuated according to the invention any overpressure in the compression and expansion chamber never causes the uncontrolled ejection of the stem-piston.

Moreover, in the gas cylinder actuator of the invention the uncontrolled return event causes the deformation or damage of only one part of the spring, i.e., of the first head or of the second head, by replacing which it is possible to restore said spring to correct and full operation, saving all the other components that form it.

Moreover, a gas cylinder actuator is provided with a performance that is not lower than that of similar gas cylinder actuators of the known type.

Furthermore, a gas cylinder actuator is provided that can be installed easily in machines and equipment of the known type without particular solutions.

The gas cylinder actuated according to the invention also acts as an overtravel safety.

The invention thus conceived is susceptible of numerous modifications and variations, all of which are within the scope of the appended claims; all the details may furthermore be replaced with other technically equivalent elements.

In practice, the components and the materials used, so long as they are compatible with the specific use, as well as the contingent shapes and dimensions, may be any according to the requirements and the state of the art.

The disclosures in Italian Patent Application No. 102015000085548 (UB2015A009302) from which this application claims priority are incorporated herein by reference.

What is claimed is:

1. A gas cylinder actuator with safety device, comprising a tubular containment jacket, two opposite heads for closing said tubular jacket, with corresponding sealing elements between the heads and the jacket, a first head having a through hole for the passage of a stem-piston, and a second opposite head, a stem-piston, between said tubular jacket, said heads and said stem-piston there being a chamber for pressurized gas, wherein at least one head of said two heads is constituted by a body that is separate with respect to said tubular jacket and is retained in said tubular jacket by means of an extraction-preventing shoulder that protrudes from the body of said head and is adapted to abut against a corresponding internal annular protrusion, wherein said internal annular protrusion is a portion of said tubular jacket and said internal annular protrusion extends radially toward a central axis of the tubular jacket, the extraction-preventing shoulder and the internal annular protrusion being adapted to cooperate in order to prevent the extraction of the head from the tubular jacket, said extraction-preventing shoulder being intended to deform, reducing its own diametrical space occupation in case of movement in an axial direction, so as to allow the relative movement of the corresponding head toward the outside of said tubular jacket and the forming of a gas discharge passage between the jacket, the head and the corresponding sealing element, wherein when the actuator is in a configuration that the gas discharge passage is formed, a portion of the sealing element extends below a first end edge of the tubular jacket, wherein the first end edge of the tubular jacket is an end of the tubular jacket further from the stem-piston as compared to a second end edge of the tubular jacket.

2. A gas cylinder actuator with safety device, comprising a tubular containment jacket, two opposite heads for closing said tubular jacket, with corresponding sealing elements between the heads and the jacket, a first head having a through hole for the passage of a stem-piston, and a second opposite head, a stem-piston, between said tubular jacket, said heads and said stem-piston there being a chamber for pressurized gas, wherein at least one head of said two heads is constituted by a body that is separate with respect to said tubular jacket and is retained in said tubular jacket by means of an extraction-preventing shoulder that protrudes from the body of said head and is adapted to abut against a corresponding internal annular protrusion that protrudes radially from an internal surface of the tubular jacket, the extraction-preventing shoulder and the internal annular protrusion being adapted to cooperate in order to prevent the extraction of the head from the tubular jacket, said extraction-preventing shoulder being intended to deform, reducing its own diametrical space occupation in case of movement in an axial direction, so as to allow the relative movement of the corresponding head toward the outside of said tubular jacket and the forming of a gas discharge passage between the jacket, the head and the corresponding sealing element, wherein said second head, for closing the tubular jacket on the opposite side with respect to the first head, is constituted by said body, having a cylindrical symmetry and shaped so as to arrange itself in a corresponding end portion of the tubular jacket, said body having:

a wider perimetric edge, for the resting in an axial direction of the end edge of the tubular jacket;

an annular slot for a sealing element, the latter being designed to operate between the external surface of the second head and the internal surface of the tubular jacket;

said deformable extraction-preventing shoulder;

an extraction-preventing safety shoulder, designed to encounter the internal annular protrusion without being deformed or by being deformed partially but so as to prevent in any case the full extraction of the second head from the end portion of the tubular jacket;

a gas loading hole;

a seat for a check valve.

3. The gas cylinder actuator according to claim 1, wherein said deformable extraction-preventing shoulder has a shape and dimensions in thickness such that when it is compressed in a direction by the internal annular protrusion it deforms by bending in a direction so as to assume a radial space occupation that is equal to, or smaller than, an internal radial space occupation formed by the internal annular protrusion, and in any case such to allow the internal annular protrusion to move at least partially beyond the deformable extraction-preventing shoulder in an axial direction.

4. The gas cylinder actuator according to claim 2, wherein said deformable extraction-preventing shoulder is arranged between the annular slot and the safety extraction-preventing shoulder.

5. The gas cylinder actuator according to claim 2, wherein said extraction-preventing safety shoulder is provided at a distance from a point of first encounter and stroke limit on the internal annular protrusion that is greater than a distance between a point of first sealing of the sealing element, in its slot, and the end edge of the tubular jacket.

6. The gas cylinder actuator according to claim 1, wherein said first head is constituted by the body that is separate with respect to the tubular jacket and is retained in said tubular jacket by means of the extraction-preventing shoulder, which protrudes from the body of the first head and is adapted to abut against said corresponding first internal annular protrusion that protrudes radially from the internal surface of the tubular jacket, said extraction-preventing shoulder and said first internal annular protrusion being adapted to cooperate in order to prevent the extraction of the first head from the tubular jacket.

7. The gas cylinder actuator according to claim 6, wherein said deformable extraction-preventing shoulder is designed to deform by reducing its own diametrical space occupation in case of movement in an axial direction, so as to allow the relative movement of the first head toward the outside of said tubular jacket and the forming of a gas discharge passage between the jacket, the head and the corresponding sealing element.

8. A gas cylinder actuator with safety device, comprising a tubular containment jacket, two opposite heads for closing said tubular jacket, with corresponding sealing elements between the heads and the jacket, a first head having a through hole for the passage of a stem-piston, and a second opposite head, a stem-piston, between said tubular jacket, said heads and said stem-piston there being a chamber for pressurized gas, wherein at least one head of said two heads is constituted by a body that is separate with respect to said tubular jacket and is retained in said tubular jacket by means of an extraction-preventing shoulder that protrudes from the body of said head and is adapted to abut against a corresponding internal annular protrusion that protrudes radially from an internal surface of the tubular jacket, the extraction-preventing shoulder and the internal annular protrusion being adapted to cooperate in order to prevent the extraction of the head from the tubular jacket, said extraction-preventing shoulder being intended to deform, reducing its own diametrical space occupation in case of movement in an axial direction, so as to allow the relative movement of the corresponding head toward the outside of said tubular jacket and the forming of a gas discharge passage between the jacket, the head and the corresponding sealing element, wherein said first head is constituted by the body that is separate with respect to the tubular jacket and is retained in said tubular jacket by means of the extraction-preventing shoulder, which protrudes from the body of the first head and is adapted to abut against said corresponding first internal annular protrusion that protrudes radially from the internal surface of the tubular jacket, said extraction-preventing shoulder and said first internal annular protrusion being adapted to cooperate in order to prevent the extraction of the first head from the tubular jacket, and wherein said first head is constituted by the body, with cylindrical symmetry, which is shaped so as to arrange itself in a corresponding end portion of the tubular jacket, said body having:

a wider perimetric edge, for resting contact in an axial direction for the end edge of the tubular jacket;

an annular slot for a sealing element, the latter being designed to operate between the external surface of the first head and the internal surface of the tubular jacket;

the deformable extraction-preventing shoulder;

an extraction-preventing safety shoulder designed to encounter a second internal annular protrusion without deforming or by deforming partially but so as to prevent in any case the full extraction of the first head from the end portion of the tubular jacket;

the through hole for the stem-piston;

an annular guiding and abutment portion for the stem-piston;

an internal annular slot for a dynamic sealing ring, adapted to provide the seal in the through hole against the stem-piston.

9. The gas cylinder actuator according to claim 8, wherein said deformable extraction-preventing shoulder has a shape and dimensions in thickness such that when it is subjected to compression in a direction by the internal annular protrusion it deforms by bending in a direction so as to assume a radial space occupation that is equal to, or lower than, the internal radial space occupation determined by the internal annular protrusion, and in any case such as to allow the internal annular protrusion a relative translational motion such as to move beyond, at least partially, the deformable extraction-preventing shoulder in an axial direction.

10. The gas cylinder actuator according to claim 8, wherein said extraction-preventing safety shoulder is provided at a distance from the point of first encounter and stroke limit on the second internal annular protrusion that is greater than the distance between the point of first sealing of the sealing ring, in its slot, and the end of the tubular jacket.

* * * * *